May 1, 1956 P. WINOKUR, JR 2,744,195

POST-PULSE CLIPPING CIRCUIT FOR PULSE MODULATORS

Filed April 23, 1952

INVENTOR.
PETER WINOKUR JR.
BY
Brown, Denk & Synnestvedt
AGENTS

United States Patent Office 2,744,195

Patented May 1, 1956

2,744,195

POST-PULSE CLIPPING CIRCUIT FOR PULSE MODULATORS

Peter Winokur, Jr., Wyncote, Pa., assignor to Philco Corporation, Philadelphia, Pa., a corporation of Pennsylvania Application April 23, 1952, Serial No. 283,895

5 Claims. (Cl. 250—27)

This invention relates to pulse modulator circuits and more particularly to an improvement in the post-pulse clipping circuit of a pulse modulator.

In radar systems it is necessary to generate short duration pulses of relatively high amplitude to control the operation of the transmitting oscillator. These short duration, high-amplitude pulses are produced in a circuit generally known as the "modulator" or "pulse modulator" circuit. One preferred form of pulse modulator circuit comprises a pulse source which may be either a hard-tube pulse generator or a pulse forming line or network coupled to the primary of a pulse transformer. The secondary of the pulse transformer is usually coupled directly to the transmitting oscillator to control the operation thereof. If the transmitting oscillator is a magnetron, the secondary of the pulse transformer is usually connected to the cathode of the magnetron. Again, if a magnetron oscillator is employed, it is customary to ground the anode, one terminal of the pulse source and one end of the primary and secondary windings of the pulse transformer. The pulse supplied by the pulse source causes the ungrounded ends of the primary and secondary windings to be negative with respect to ground for the duration of the pulse. For this reason, the pulse supplied by the pulse source will be referred to hereinafter as a negative pulse.

A pulse modulator circuit of this type is subject to the disadvantage that the inductive nature of the pulse transformer, the distributed capacitances of the circuit and the nonlinearity of the magnetron oscillator cause a general voltage backswing to appear across the primary and secondary of the pulse transformer immediately following the termination of the main pulse supplied by the pulse source. The time-voltage area of the backswing is always equal to the area of the pulse itself but the shape is determined by the values of the resistance, capacitance and inductance in the primary circuit and by the value of the load on the secondary. If the secondary impedance is very high during the occurrence of the backswing, as in the case of a magnetron with a positive signal on the cathode, high frequency oscillations usually occur in the primary circuit. These high frequency oscillations are superimposed upon the general backswing mentioned above. If, as a result of these oscillations, the cathode of the magnetron is made negative at some time following the application of the main pulse, spurious oscillations may be generated by the magnetron which will interfere with the normal operation of the radar system. In addition, the positive backswing may exceed the peak inverse rating of the magnetron. If this occurs, the magnetron will be damaged by the resultant arcing. There is some indication that a magnetron may generate noise signals if the cathode is sufficiently positive with respect to the anode. This noise, if generated, would tend to obscure received target echo signals. To hold the general backswing to a very low value and to minimize or eliminate the oscillations superimposed on this general backswing, it is conventional practice to connect a load resistor in series with some form of electronic switch across the primary of the pulse transformer. The electronic switch is so connected that the load on the primary is substantially infinite during the generation of the desired negative pulse and drops to some low value immediately following the termination of this pulse so that the oscillatory circuit represented by the windings of the pulse transformer and the distributed capacitances of the circuit is highly damped. In general, the lower the value of the load resistance, the more effective is the damping or post-pulse clipping as this action is generally termed. It has been the general practice heretofore to employ a high vacuum diode tube in series with a load resistor as the post-pulse clipping circuit. The diode is so connected that its anode is negative during the occurrence of the negative pulse in the secondary of the pulse transformer but becomes positive upon the occurrence of the backswing following the generation of the pulse. The peak current limitations of available diode tubes necessitates the use of a load resistance sufficiently high to preclude effective clipping in high power systems. A hot-cathode, gaseous-discharge electron tube, commonly known as a thyratron, has a much higher peak current rating than a high vacuum diode. Therefore, it is possible to employ a much lower value of load resistance in a post-pulse clipping circuit employing a thyratron. However, difficulty has been encountered in the use of thyratrons due to the fact that the high grid-anode capacitance of the thyratron permits a relatively large negative signal to be developed on the grid in response to the negative pulse appearing at the anode of the thyratron during generation of the main pulse. This negative signal charges the grid-cathode capacitance of the thyratron to the potential appearing at the grid. The grid-cathode capacitance must be discharged before the thyratron will fire and initiate clipping action upon occurrence of the post-pulse backswing. Heretofore this has necessitated the use of a separate source of positive signals for triggering the grid at a time immediately following the termination of the main pulse. It is generally undesirable to have to include such an additional source of signals since it adds to the complexity of the system. In addition, it is generally impossible or impractical to provide a source impedance that is sufficiently low to make the discharge time of the grid-cathode capacitance of the thyratron negligible. If the discharge time of this capacitance is not negligible, then a spike of positive voltage will appear across the primary of the pulse transformer before the thyratron fires. This voltage spike may set up oscillations in the primary circuit which will interfere with the operation of the clipping circuit and which may cause the generation of spurious signals in the magnetron.

It is an object of the present invention to provide a pulse modulator circuit employing a thyratron post-pulse clipping circuit which is not subject to the disadvantages mentioned above.

It is a further object of the present invention to provide a novel circuit for triggering the thyratron in the post-pulse clipping circuit of a radar modulator.

These and other objects of the present invention are generally accomplished by applying a positive ionizing pulse to the grid of the thyratron during the time that the main pulse is being generated. This positive ionizing pulse neutralizes or overcomes the negative pulse coupled to the grid through the anode-grid capacitance of the thyratron.

For a better understanding of the invention, together with other and further objects thereof, reference should now be made to the following detailed description which is to be read in connection with the accompanying drawings in which.

Figure 1:
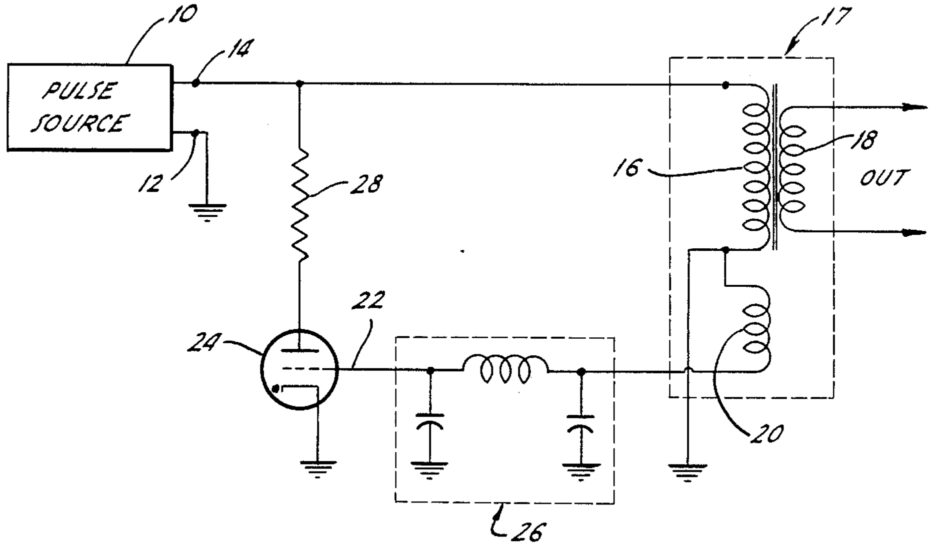
Fig. 1 is a schematic diagram of a preferred embodiment of the invention.

Referring now to Fig. 1, pulse source 10, which may be a pulse forming line in series with a thyratron pulser tube, has one terminal 12 returned to ground and a second terminal 14 connected to one end of primary winding 16 of a pulse transformer generally represented by the dashed line 17. A second end of winding 16 is returned to ground. The secondary winding of the pluse transformer 17 is shown at 18. The pulse transformer 17 of the present invention is provided with a third or trigger winding 20 which has one end returned to ground and a second end connected to the control grid 22 of a thyratron 24 through a signal delay or pulse stretching network 26. The signal delay network 26, which may comprise series inductance and shunt capacitance as shown in Fig. 1, has as its function the delaying of a signal appearing across trigger winding 20 for a time interval that is short compared to the duration of the main pulse. The anode of thyratron 24 is connected to terminal 14 of pulse source 10 through a load resistor 28. The cathode of thyratron 24 is connected to ground.

Figure 2:
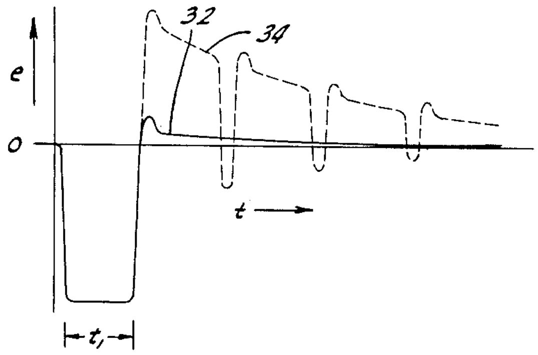
Fig. 2 is a time versus amplitude plot showing the variation in potential across the primary of a pulse transformer with and without damping.

The solid line in Fig. 2 represents the potential variation across primary winding 16 in response to a negative pulse generated by pulse source 10. The pulse produced by pulse source 10 has a time duration $t_1$ as shown in Fig. 2. This negative pulse is followed by the positive post-pulse backswing as shown at 32 in Fig. 2. The relatively small positive excursion of portion 32 corresponds to the excursion that would occur in the primary circuit of the pulse transformer that is highly damped. The broken curve 34 of Fig. 2 illustrates the potential variation that would occur upon the removal of the damping or clipping circuit. The variation shown is typical of the variation that might occur with a pulse forming line type of pulse generator.

Figure 3:
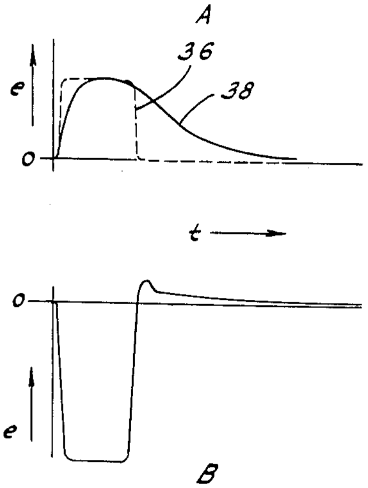
Fig. 3 is a time versus amplitude plot of certain potentials existing in the circuit of Fig. 1.

Fig. 3 illustrates the potential variations which occur at various points in the circuit of Fig. 1. The curve of Fig. 3B is substantially identical to the solid line curve of Fig. 2 and represents the potential variation across the primary winding 16. The broken line curve 36 of Fig. 3A depicts the positive pulse that appears across trigger winding 20 during the interval that a negative pulse appears across primary winding 16. The solid line curve 38 of Fig. 3 illustrates the potential variation at grid 22 of thyratron 24. The signal appearing at grid 22 will correspond to the pulse appearing across trigger winding 20 delayed or stretched by signal delay means 26. It will become apparent as the description of the invention proceeds that it is only necessary that the trailing edge of the pulse appearing across trigger winding 20 be delayed for a time slightly greater than the time of fall of the negative pulse appearing across primary winding 16.

The circuit shown in Fig. 1 operates as follows: The negative pulse generated by pulse source 10 causes a negative pulse to be applied across primary winding 16 of the pulse transformer. A negative potential is also applied to grid 22 of thyratron 24 by reason of the grid-anode capacitance of thyratron 24. However, a positive pulse appears across trigger winding 20 and this positive pulse is supplied through signal delay means 26 to grid 22 to neutralize or overcome the negative pulse applied to grid 22 through the grid-anode capacitance. The positive pulse supplied to grid 22 results in ionization of the gas in thyratron 24. However, thyratron 24 does not fire since the potential on the anode is highly negative with respect to the cathode. At the termination of the pulse generated by pulse source 10, the potential across primary winding 16 falls rapidly to zero and then tends to reverse in the direction due to the energy stored in the inductance of the windings of the transformer. When the signal across primary winding 16 falls to zero, the positive signal appearing across trigger winding 20 also falls to zero. However, signal delay means 26 holds grid 22 positive for a sufficient length of time to prevent de-ionization in thyratron 24 before the anode becomes positive as a result of the post-pluse backswing appearing across winding 16. As soon as the positive potential at the anode of tube 24 exceeds the firing potential, thyratron 24 will fire and the low impedance presented by load resistor 28 and thyratron 24 will prevent any further rise in potential across primary winding 16. The current flowing through load resistor 28 and thyratron 24 to ground will dissipate the energy stored in the windings of the pulse transformer. It can be seen from the above description that only the trailing edge of the pulse appearing across trigger winding 20 need be delayed and that the shape of the delayed pulse applied to grid 22 is of little importance. Therefore, the design of signal delay network 26 is not critical. In fact, if thyratron 24 has a relatively long de-ionization time, signal delay network 26 may be dispensed with and winding 20 connected directly to grid 22. Since the pulse applied across primary winding 16 is of relatively high amplitude, winding 20 need only have a relatively few turns compared to primary winding 16. This results in the dual advantage of simplicity in the mechanical construction of the transformer and low source impedance for the trigger winding.

It should be noted that a novel feature of the present invention is the provision for generating, during the occurrence of the main pulse, a signal for ionizing the thyratron 24 at a period immediately following the termination of the main pulse. This feature mimimizes the necessary additions to the basic modulator system and insures a reliable source of trigger signals for thyratron 24.

While there has been described what is at present considered to be the preferred embodiment of the present invention, it will be obvious that various changes and modifications may be made therein without departing from the spirit and scope of the hereinafter appended claims.

I claim:

1. In a pulse modulator circuit including a pulse source having first and second output terminals, said first terminal being normally more negative than said second terminal during the generation of a pulse by said pulse source, and a pulse transformer having a primary winding connected between said two terminals, a post-pulse clipping circuit comprising a gas-discharge electron tube having at least an anode, a cathode and a control grid, a load resistor connected between said anode and said first output terminal, means connecting said cathode to said second output terminal, a trigger winding inductively associated with said primary winding and means connecting said trigger winding to said cathode and said grid, said trigger winding being phased to cause a positive signal to be applied at said grid during the interval that said first terminal is more negative than said second terminal.

2. A pulse modulator circuit comprising a pulse source having first and second output terminals, said first terminal being normally more negative than said second terminal during the generation of a pulse by said pulse source, a pulse transformer having at least a primary, a secondary and a trigger winding, said primary winding being connected between said first and second output terminals, a gas-discharge electron tube having at least an anode, a cathode and a control grid, a load resistor connected between said anode and said first output terminal, means connecting said cathode to said second output terminal, means connecting one end of said trigger winding to said cathode, means connecting the other end of said trigger winding to said control grid, the end of said trigger winding connected to said grid being normally more posi-tive than the end connected to said cathode during the generation of a pulse by said pulse source.

3. A pulse modulator circuit comprising a pulse source having first and second output terminals, said first terminal being normally more negative than said second terminal during the generation of a pulse by said pulse source, a pulse transformer having at least a primary, a secondary and a trigger winding, said primary winding being connected between said first and second output terminals of said pulse source, a thyratron having at least an anode, a cathode and a control grid, a load resistor connected between said anode and said first output terminal, means connecting said cathode to said second output terminal, means connecting one end of said trigger winding to said cathode, signal delay means coupling the other end of said trigger winding to said control grid, said signal delay means having a delay time less than the duration of the pulses generated by said pulse source, the end of said trigger winding coupled to said grid being normally more positive than the end connected to said cathode during the generation of a pulse by said pulse source.

4. A pulse modulator circuit comprising a pulse source having first and second output terminals, said first terminal being normally more negative than said second terminal during the generation of a pulse by said pulse source, a pulse transformer having at least a primary, a secondary and a trigger winding, the number of turns on said trigger winding being small compared to the number of turns on said primary winding, said primary winding being connected between said first and second terminals, a thyratron having at least an anode, a cathode and a control grid, a load resistor connected between said anode and said first output terminal, means coupling said cathode to said second output terminal, means connecting one end of said trigger winding to said cathode, network means coupling a second terminal of said trigger winding to said control grid, said second end being normally more positive than said first-mentioned end during the generation of a pulse from said pulse source, said network means being adapted to delay at least the trailing edge of the pulse appearing across said trigger winding by an interval at least equal to the time of fall of the trailing edge of the pulse produced by said pulse source.

5. In a pulse modulator circuit including a pulse source having at least a first output terminal, said output terminal being normally at a high potential with respect to a point of reference potential during the generation of a pulse by said pulse source, and a pulse transformer having a primary winding connected between said first output terminal and said point of reference potential, a post-pulse clipping circuit comprising a gas-discharge electron tube having at least an anode, a cathode and a control grid, a load resistor connected between said anode and the end of said primary winding which is normally more negative than the other end during the generation of a pulse by said pulse source, means connecting said cathode to the other end of said primary winding, and a low impedance source for energizing said grid, said source comprising a trigger winding inductively associated with said primary winding, the number of turns on said trigger winding being small compared to the number of turns on said primary winding, means connecting one end of said trigger winding to said cathode, means connecting the other end of said trigger winding to said grid, said trigger winding being phased so that said end connected to said grid is positive with respect to the end connected to said cathode during the generation of a pulse by said pulse source.

References Cited in the file of this patent

UNITED STATES PATENTS

| | | |
|---|---|---|
| 2,331,242 | Smith | Oct. 5, 1943 |
| 2,405,070 | Tonks | July 30, 1946 |
| 2,444,782 | Lord | July 6, 1948 |
| 2,457,522 | Bias et al. | Dec. 28, 1948 |
| 2,469,977 | Morrison | May 10, 1949 |
| 2,496,543 | Kanner | Feb. 7, 1950 |
| 2,596,142 | Gerwin | May 13, 1952 |